US006181024B1

(12) United States Patent
Geil et al.

(10) Patent No.: US 6,181,024 B1
(45) Date of Patent: Jan. 30, 2001

(54) DEVICE FOR LOCKING AND UNLOCKING A DOOR LOCK

(75) Inventors: Andreas Geil, Stuttgart; Jörg Jehlicka, Ludwigsburg; Stephan Schmitz, Stuttgart, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/191,100

(22) Filed: Nov. 12, 1998

(30) Foreign Application Priority Data

Nov. 12, 1997 (DE) .............................................. 197 50 023

(51) Int. Cl.[7] ...................................................... B60R 25/10

(52) U.S. Cl. ........................ 307/10.2; 307/10.1; 180/287; 340/542; 70/256; 70/257

(58) Field of Search ................................ 307/10.2, 10.1; 340/825.31, 825.34, 542, 541; 250/221; 180/287; 70/256, 257

(56) References Cited

U.S. PATENT DOCUMENTS

| | | | | |
|---|---|---|---|---|
| 4,354,189 | * | 10/1982 | Lemelson | 340/825.31 |
| 4,800,361 | * | 1/1989 | Greif | 340/541 |
| 5,708,307 | * | 1/1998 | Iijima et al. | 180/287 |
| 5,887,466 | * | 3/1999 | Yoshizawa et al. | 307/10.2 |

FOREIGN PATENT DOCUMENTS

| | | |
|---|---|---|
| 39 00 494 A1 | 7/1990 | (DE) . |
| 42 21 142 C2 | 1/1994 | (DE) . |
| 43 30 118 C1 | 1/1995 | (DE) . |
| 196 19 975 C1 | 5/1996 | (DE) . |
| 196 26 914 C1 | 7/1996 | (DE) . |
| 196 17 038 A1 | 11/1997 | (DE) . |
| 2 674 895 | 4/1991 | (FR) . |

OTHER PUBLICATIONS

Keyless Entry System with Radio Card Transponder, Motoki Hirano et al., IEEE Transactions on Industrial Electronics, vol. 35, 1988, pp. 208–216.

* cited by examiner

*Primary Examiner*—Albert W. Paladini
(74) *Attorney, Agent, or Firm*—Kenyon & Kenyon

(57) ABSTRACT

A device for locking and unlocking a door lock provided with a door handle on an object, in particular a motor vehicle, has a transmitter unit arranged on the object and a transponder unit assigned to a user. Different methods of operating the device are made possible by designing the door lock as an electromechanical lock which can be locked and unlocked optionally by a manually operable key and/or a button arranged on the inside or electronically by the transmitter and transponder units, and operation is ensured even in the event of a failure of the electric power supply.

9 Claims, 1 Drawing Sheet

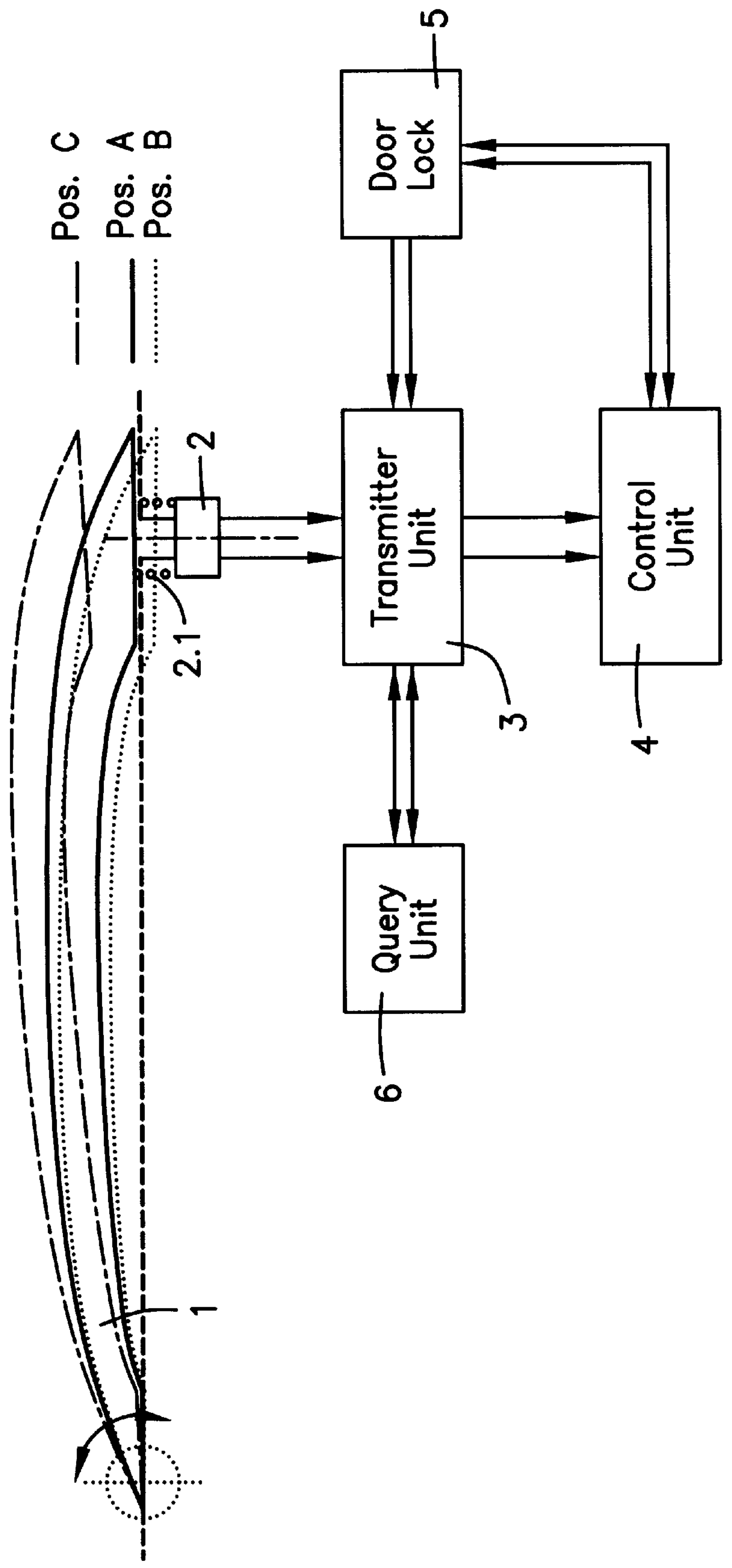
Pos. C
Pos. A
Pos. B
Door Lock
5
Transmitter Unit
Control Unit
Query Unit
1
2
2.1
3
4
6

DEVICE FOR LOCKING AND UNLOCKING A DOOR LOCK

FIELD OF THE INVENTION

The present invention relates to a device for locking and unlocking a door lock provided with a door handle on an object, in particular on a motor vehicle, having a transmitter unit arranged on the object and a transponder unit assigned to the user.

BACKGROUND INFORMATION

A device for keyless locking and unlocking of a door is described in "Keyless Entry System with Radio Card Transponder," Motoki Hirano et al., IEEE Transactions on Industrial Electronics, vol. 35, 1988, pages 208 through 216. A door with an electronic lock can be locked and unlocked with this known device because a transmitter unit mounted on a motor vehicle queries a response unit (transponder) assigned to the user and causes the electronic lock to be unlocked when the authorized user is identified. One problem encountered with such a device for locking and unlocking is that an additional battery must be provided to permit operation of the device with the electronic lock in the event the vehicle battery is dead.

SUMMARY OF THE INVENTION

An object of the present invention is to provide a device so that it will not need any additional battery while nevertheless making it possible to open the door or keep it locked even in emergency situations.

According to the present invention, the door lock is designed as an electromechanical lock which can be locked and unlocked optionally either with a manually operable key and/or a button arranged on the inside or electronically with the transmitter unit and transponder.

No additional power supply is necessary because manual override is possible due to the alternative options of locking and unlocking either manually with a key and/or a button on the inside or electronically with the transmitter unit and transponder. A traditional electromechanical lock, such as that provided with a central locking system can be used with simple modifications for the alternative operation.

The operation of electronic locking and unlocking is simple due to the fact that a manually operable triggering unit is provided in the area of the door handle to initialize the query between the transmitter unit, including an access authorization module, and the transponder. It is advantageous for ease of handling if the triggering unit is linked to the door handle.

One embodiment that is advantageous for ease of operation involves the triggering unit being designed as a pushbutton. Electronic unlocking by triggering the pushbutton takes place in one direction, while opening the door with the door handle takes place in the opposite direction, so that two clearly separate operating procedures are differentiated, and a short period of time is required for the query protocol and mechanical unlocking as a result of the reverse movement.

One possible advantageous arrangement is to arrange the triggering unit at one of the two ends of the door handle.

If the door lock is part of a vehicle's central locking system, it is possible to retrofit an existing system to electronic operation with a transmitter and transponder using simple means, while yielding advantageous operation at the same time.

A reversal of movement between operation of the triggering unit and opening with the door handle is ensured by the fact that the triggering unit can be operated by depressing it, and the door handle can be operated by pulling it to open the door.

If an attenuator is built into the door handle, a lag time for automatic interrogation of the transponder and unlocking is ensured.

BRIEF DESCRIPTION OF THE DRAWING

The FIGURE shows a schematic diagram of an electromechanical door lock which can be locked and unlocked optionally by a transmitter and transponder or manually as an alternative.

DETAILED DESCRIPTION

As shown in the FIGURE, a door opener or door handle 1 is mounted on the door so that it can be pivoted in one end area, while a pushbutton 2 which is provided in its other end area can be operated by light pressure on door handle 1 and by moving it into position B. A transmitter unit 3 may include an access authorization module, means for transmitting signals to query unit 6 and/or means for receiving signals from the query unit 6. By operating pushbutton 2, the transmitter unit 3 is initialized, so that it initiates a query to the query unit 6. The query unit 6 may include a transponder assigned to a particular user. The transponer may include means for transmitting signals to the transmitter unit 4 and/or means for receiving signals from the transmitter unit 3. With a fast protocol, this query can be accomplished in 65 ms, for example. If access is authorized, a door lock 5 on the door is brought from a locked state to an unlocked state on instruction by a control unit 4. By then pulling door handle 1 into position C, the door can be opened, and the door opener moves back into starting position A when the door handle is triggered. If the door is to be locked again, the door opener is pressed back into position B. In starting position A, door handle 1 can be held by a restoring spring 2.1 or a similar element.

Another possibility for achieving a lag time for the automatic query and unlocking is to install an attenuator in the door handle or in the suspension for the holding bracket. This delays the movement as a whole.

If there is a failure in the power supply for the device for locking and unlocking, the door can be operated by a manually operable key which acts on door lock 5 and can also be used optionally as an alternative to the electronic locking and unlocking by the transmitter and transponder. The door can be locked and unlocked from the inside by a user by operating a button, as is usual with a mechanical or electromechanical door lock. A user can also recognize whether door lock 5 is locked or unlocked in this way.

These measures yield an electronically operable door lock with a mechanical override. In the event of a power failure, the door lock can be operated without any additional emergency power supply. When the door is closed but unlocked, it can be opened from either the inside or outside. Even when locked, exit from the vehicle in an emergency situation, for example, is guaranteed by operation of the button.

The electronic transmitter and transponder for locking and unlocking can also be retrofitted in a conventional central locking system of a vehicle. This device makes it possible to use the existing operating elements.

What is claimed is:

1. A system, comprising:

a transmitter unit arranged on a motor vehicle;

a transponder unit coupled to the transmitter unit, the transponder unit identifying a particular user of the system and being queried by the transmitter unit; and a door lock of the motor vehicle having a door handle, the door lock including an electromechanical lock, the electromechanical lock capable of being manually locked and unlocked by a device for manually locking and unlocking the electromechanical lock, the electromechanical lock capable of being electronically locked and unlocked by a device for electronically locking and unlocking the electromechanical lock as a function of a position of the door handle and as a function of the query between the transmitter unit and the transponder unit.

2. The system according to claim 1, wherein the electromechanical lock is adapted to be locked and unlocked manually with at least one of a manually operable key and a button on an inside of the motor vehicle.

3. The system according to claim 1, wherein the door lock is part of a central locking system of the motor vehicle.

4. The system according to claim 1, further comprising an attenuator situated in the door handle.

5. The system according to claim 1, further comprising:

a manually operable triggering unit arranged in an area of the door handle of the motor vehicle for initializing an inquiry between the transmitter unit and the transponder unit; and an access authorization module coupled to the transmitter unit.

6. The system according to claim 5, wherein the triggering unit is attached to the door handle.

7. The system according to claim 5, wherein the triggering unit includes a pushbutton.

8. The system according to claim 5, wherein the triggering unit is situated on one of two ends of the door handle.

9. The system according to claim 5, wherein the triggering unit is operated when the user depresses the triggering unit, and the door handle is operated when the user pulls the door handle to open.

* * * * *